US007423853B2

(12) United States Patent
Gupta

(10) Patent No.: US 7,423,853 B2

(45) Date of Patent: Sep. 9, 2008

(54) ALUMINUM WOUND TRANSFORMER

(75) Inventor: Sham Gupta, Des Plaines, IL (US)

(73) Assignee: Schumacher Electric Corporation, Mount Prospect, IL (US)

( * ) Notice: Subject to any disclaimer, the term of this patent is extended or adjusted under 35 U.S.C. 154(b) by 156 days.

(21) Appl. No.: 11/450,003

(22) Filed: Jun. 9, 2006

(65) Prior Publication Data

US 2007/0285852 A1 Dec. 13, 2007

(51) Int. Cl.
*H02H 7/04* (2006.01)
*H02H 7/00* (2006.01)

(52) U.S. Cl. ........................................................ 361/38

(58) Field of Classification Search .................. 361/38, 361/268

See application file for complete search history.

(56) References Cited

U.S. PATENT DOCUMENTS

| | | | | |
|---|---|---|---|---|
| 4,581,820 | A * | 4/1986 | Zahn et al. | 29/855 |
| 4,639,705 | A | 1/1987 | Beisser | |
| 5,317,300 | A * | 5/1994 | Boesel | 336/96 |
| 7,034,648 | B2 | 4/2006 | Shirahata et al. | |
| 2004/0120084 | A1 * | 6/2004 | Readio et al. | 361/38 |

* cited by examiner

*Primary Examiner*—Ronald W Leja
(74) *Attorney, Agent, or Firm*—John S. Paniaguas; Katten Muchin Rosenman LLP

(57) ABSTRACT

An iron core transformer with at least one primary winding and at least one secondary winding of which at least one of the windings are wound with aluminum wire is disclosed for use in relatively low power applications, for example 5 kVa or below. The primary and secondary windings are connected to primary and secondary terminals. In order to overcome the effects of oxidation of the aluminum wire over time which can result in compromising the connection between the aluminum wire and its corresponding terminal, the terminals are formed as insulation displacement type terminals that are configured to strip any coatings or other contaminants on the aluminum wire during insertion of the aluminum wire into the terminal. The terminals are further configured to apply a constant spring biasing force against the aluminum conductor after it has been inserted. Thus, the transformer in accordance with the present invention is able to take advantage of the relatively low cost of aluminum wire, while at the same time providing stable connections between the aluminum wire and the transformer terminals. In order to facilitate the assembly of the transformer, in accordance with one aspect of the invention, a number of sockets are integrated into the bobbin for receiving the transformer terminals.

13 Claims, 5 Drawing Sheets

ALUMINUM WOUND TRANSFORMER

BACKGROUND OF THE INVENTION

1. Field of the Invention

The present invention relates to an electrical transformer and more particularly to a iron core electrical transformer with one or more aluminum windings that is constructed in a manner to overcome known problems associated with aluminum wire due to oxidation.

2. Description of the Prior Art

Various transformer configurations are known in the art. With the exception of primary less donut type current transformers, most transformers include at least one primary winding and at least one secondary winding. For transformers with relatively low power ratings, for example, 5 kVa and below, the windings are known to be wound around a bobbin or a paper tube. The windings are magnetically coupled together by a principle known as mutual inductance by an iron core. The iron core is normally formed by a plurality of laminated steel (or other ferromagnetic material) plates disposed in the core of the bobbin as well as around the exterior of the windings.

Other than a special type of transformer, known as an auto-transformer, the primary and secondary windings are not connected together. Rather, the windings are connected to separate sets of primary and secondary terminals. In particular, for a single phase transformer, the ends of the electrical conductors forming the primary and secondary windings are terminated to primary and secondary terminals, respectively. The primary and secondary terminals enable the transformer to be connected to an external primary circuit and an external secondary circuit.

The ratio of the number of turns in the primary winding to the number of turns in the secondary winding, known as the turns ratio, defines the relationship between the primary voltage and current to the secondary voltage and current. In order to provide more flexibility for the transformer and to reduce inventory, many known transformers are known to be provided with one or more primary and/or secondary taps. These taps represent intermediate locations between the ends of the windings having turns less than the number of turns in the full primary or secondary windings so that the transformer can be used for applications requiring different turns ratios. It is also known to provide a primary and/or secondary tap to provide intermediate primary or secondary voltages, i.e. voltages less than the full winding voltage. These taps are also terminated to terminals to enable the taps to be connected to external circuits.

Most known transformers utilize copper conductors for both the primary and secondary windings. As is known in the art, copper has many advantages over other electrical conductors, such as aluminum. For example, copper is a better electrical conductor. In particular, by volume, the electrical conductivity of aluminum is known to be about 62% that of copper. Thus, relatively smaller copper conductors are required for a given electrical current than aluminum conductors for the same magnitude of current. Copper conductors are also known to have superior mechanical strength than aluminum conductors. Thus, in applications where relatively large short circuit currents are possible, copper conductors offer the mechanical strength to withstand the forces generated by relatively large short circuit currents.

One of the most important characteristics of copper which makes it ideal for use as an electrical conductor relates to its connectivity. In particular, connectivity relates to the connections between the electrical conductor and other devices, such as terminals to which the electrical conductor is terminated. More particularly, it is important that connections to the electrical conductor be as secure as possible. Loose connections to the electrical conductor can cause local heating which can result in a fire hazard.

Copper is essentially corrosion free. As such, connections to copper conductors are stable and can be expected to remain stable for long periods of time. Aluminum conductors, on the other hand, are subject to oxidation over time, and as such build up a film on the surface of the electrical conductor which tends to weaken connections over time. Because of this problem, aluminum is used sparingly as an electrical conductor.

One major drawback of copper is the cost. The cost of copper far exceeds the cost of aluminum especially at the present time. As such, in order to reduce the cost of certain electrical devices, such as transformers, aluminum wire is known to be used for coil windings. Examples of transformers with one or more aluminum windings are disclosed in U.S. Pat. Nos. 4,639,705 and 7,034,648, hereby incorporated by reference. Even though the transformers disclosed in those patents are relatively less expensive to manufacture than corresponding transformers with all copper windings, the aluminum wound transformers still suffer from the connectivity problem discussed above. Thus, there is a need for relatively less expensive transformers which do not have the connectivity problem discussed above.

SUMMARY OF THE INVENTION

The present invention relates to an iron core transformer with at least one primary winding and at least one secondary winding of which at least one of the windings are wound with aluminum wire, for use in relatively low power applications, for example 5 kVa or below. The primary and secondary windings are connected to primary and secondary terminals. In order to overcome the effects of oxidation of the aluminum wire over time which can result in compromising the connection between the aluminum wire and its corresponding terminal, the terminals are formed as insulation displacement type terminals that are configured to strip any coatings or other contaminants on the aluminum wire during insertion of the aluminum wire into the terminal. The terminals are further configured to apply a constant spring biasing force against the aluminum conductor after it has been inserted. Thus, the transformer in accordance with the present invention is able to take advantage of the relatively low cost of aluminum wire, while at the same time providing stable connections between the aluminum wire and the transformer terminals. In accordance with one aspect of the invention, a number of sockets are integrated into the bobbin for receiving the transformer terminals in order to facilitate the assembly of the transformer.

DESCRIPTION OF THE DRAWING

These and other advantages of the present invention will be readily understood with reference to the following specification and attached drawing wherein.

DETAILED DESCRIPTION

Figure 1:
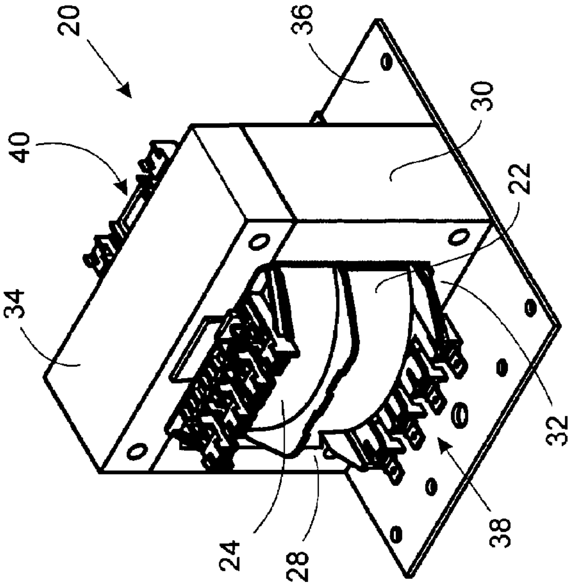
FIG. 1 is an isometric view of a transformer with at least one aluminum winding in accordance with the present invention.
Figure 4:
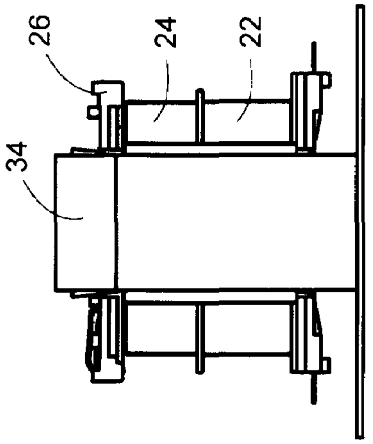
FIG. 4 is side view of the transformer illustrated in FIG. 1.
Figure 2:
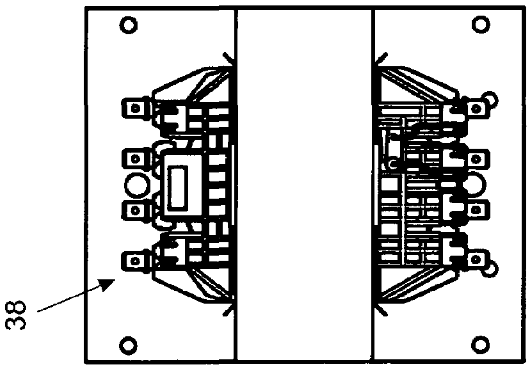
FIG. 2 is a top view of the transformer illustrated in FIG. 1.
Figure 3:
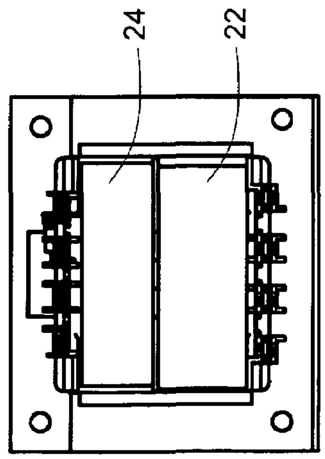
FIG. 3 is a front view of the transformer illustrated in FIG. 1.

The present invention relates to an iron core transformer with at least one primary winding and at least one secondary winding in which at least one of the windings are wound with aluminum wire, for use in relatively low power applications, for example 5 kVa or below. The primary and secondary windings are connected to primary and secondary terminals. In order to overcome the effects of oxidation of the aluminum wire over time, the terminals are formed as insulation displacement type terminals that are configured to strip any coatings or other contaminants on the aluminum wire during insertion of the aluminum wire into its corresponding terminal. The terminals are further configured to apply a constant spring biasing force against the aluminum conductor after it has been inserted. Thus, the transformer in accordance with the present invention is able to take advantage of the relatively low cost of aluminum wire while at the same time providing stable connections between the aluminum wire and the transformer terminals. In order to facilitate the assembly of the transformer in accordance with the invention, in one embodiment a number of sockets are integrated into the bobbin for receiving the transformer terminals.

As will be understood by those of ordinary skill in the art, the principles of the present invention are applicable to various transformer configurations. For example, the principles of the present invention are applicable to single and multiple phase transformers. The principles of the invention are also to bobbin wound transformers, normally wound by a machine, as well as custom wound transformers that do not incorporate a bobbin as well as shell type and core type transformers.

FIGS. 1-4 illustrate an exemplary embodiment of the transformer in accordance with the present invention and identified with the reference numeral 20. A single phase transformer is shown with a single primary winding 22 and a single secondary winding 24, normally used in relatively low power applications, for example 5 kVa or less. In this embodiment, the primary and secondary windings 22 and 24, respectively, are wound, for example, by a machine, around a bobbin 26. As will be discussed in more detail below, the bobbin 26 is formed with a central aperture for receiving a ferromagnetic core. As shown, the transformer illustrated is formed as a "shell" type device and includes a ferromagnetic core, which, in turn, includes one vertical leg (not shown) of the ferromagnetic magnetic core. The ferromagnetic core also includes two additional vertical legs 28 and 30 and a lower horizontal leg 32, configured as an upper case E. The ferromagnetic core also includes an upper horizontal leg 34. In order to reduce so-called eddy current heating, it is known in the art to form the ferromagnetic core from a plurality of relatively thin plates, known as laminations, that are magnetically insulated from each other. These laminations may be secured together by various conventional means, such as fasteners. As shown in FIGS. 1-4, the laminations may be secured to a base 36, for example, a non-ferromagnetic base, by various attachment methods, such as welding.

As will be discussed in more detail below, the primary and secondary windings 22 and 24 respectively, as well as any taps, as defined above, are connected to primary and secondary terminals 40 and 38, respectively. As will be discussed in more detail below, the bobbin 26 may be integrally formed with sockets for receiving at least one set of primary terminals 40 and at least one set of secondary terminals 38. In accordance with an important aspect of the invention, all transformer terminals that are connected to aluminum conductors are formed as insulation displacement type terminals which strip away any coatings or other contaminants on the aluminum wire and apply a constant biasing force between the terminal and the aluminum conductor to provide a stable connection over time that is not compromised by oxidation of the aluminum wire.

FIGS. 5-11 illustrate an exemplary bobbin 26 for use with the present invention. The bobbin 26 may be formed, for example, by injection molding from a non-magnetic and non-electrically conductive plastic material, such as DuPont Zytel 70G331 or MDE RGN66G33 or DuPont Rynite FRS30. Consideration must also be given to the temperature load to which the bobbin 26 will be subjected. For relatively low power applications, for example, 1 kVa or less, the plastic material should be rated for 130° C. or higher.

Figure 5:
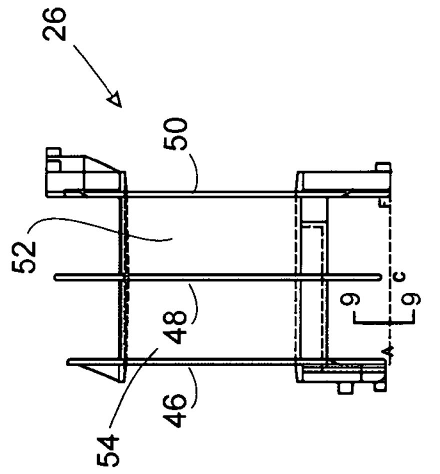
FIG. 5 is a side view of an exemplary three flange bobbin for use with the present invention.

As shown best in FIG. 5, the exemplary bobbin 26 is formed with a generally elongated rectangular member with a central aperture 44. Three or more axially spaced apart flanges 46, 48 and 50 are formed around the elongated rectangular member. These flanges 46, 48 and 50 define a rectangular cavity 52 for the primary winding 22 and another rectangular cavity 54 for the secondary winding 24.

In one embodiment of the invention, one or more of the upper and lower flanges 42 and 46, respectively, may be formed with integrated sockets for receiving primary and/or secondary terminals 38 and 40, respectively. In order minimize the number of different types of bobbins 26 and thus injection molds required, the upper and lower flanges 46 and 50, respectively, may be formed to accommodate different terminal configurations. For example, referring to FIGS. 6 and 7, the upper flange 46 is illustrated. As shown, the upper flange 46 may be formed with a single row of sockets, generally identified with the reference numeral 56, for receiving primary terminals 38, as generally illustrated in FIGS. 15A-15D and FIGS. 16A-16C. In this exemplary embodiment, the primary terminals 38 are only formed on one end 58 of the upper flange 46 but could also have been formed on the other end 60 and in a stacked arrangement, as generally illustrated in FIG. 11, as well.

Figure 11:
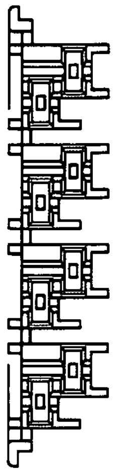
FIG. 11 is a sectional view along line 11-11 of FIG. 7 further illustrating an optional stacked arrangement of sockets formed on an opposing end of the bottom flange.
Figure 7:
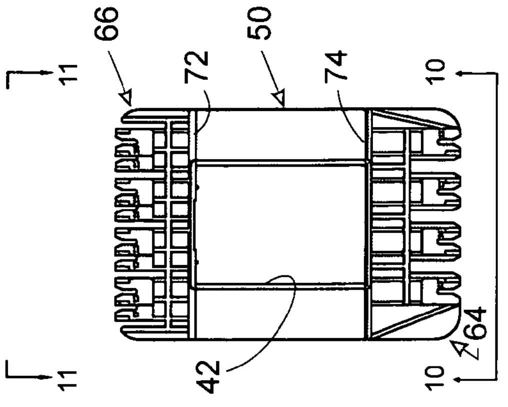
FIG. 7 is a bottom view if the bobbin illustrated in FIG. 5 illustrating the bottom flange with integrated sockets formed on both ends of the flange for receiving secondary terminals.
Figure 10:
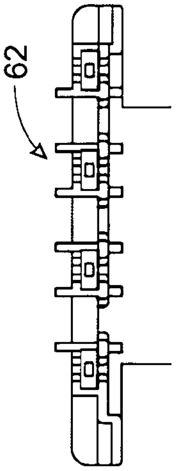
FIG. 10 is a sectional view along line 10-10 of FIG. 7 further illustrating the sockets for the secondary terminals formed on one end of the bottom flange.

The lower flange 50 is illustrated in FIGS. 7, 10 and 11. As shown, the lower flange 50 may be formed to accommodate multiple configurations of the secondary terminals 40. More particularly, the lower flange 50 may be formed with at least one row of integrally formed sockets, generally identified with the reference numeral 62, optionally on both ends 64 and 66 of the lower flange 50. In addition, the lower flange 50 may optionally be formed with another row of sockets 62 in a stacked configuration, as generally illustrated in FIG. 11.

In order to secure the iron core to the bobbin 26, the upper and lower flanges 46 and 50 may be formed with outwardly extending ribs. In particular, the upper flange 46 formed with a pair of spaced apart elongated ribs 68 and 70. The spacing between the ribs 68 and 70 on the upper flange 46 is selected to receive and capture the upper leg 34 (FIG. 1) of the iron core. Similarly, the lower flange 50 is formed with a pair of spaced apart outwardly extending ribs 72 and 74. The spacing between the ribs 72 and 74 on the lower flange 50 is selected to receive and capture the lower leg 32 (FIG. 1) of the iron core.

Figure 9:
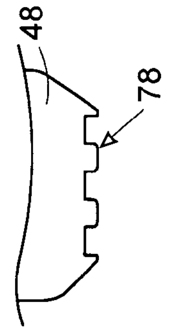
FIG. 9 is a partial sectional view along line 9-9 of FIG. 5 illustrating an optional detail formed on opposing ends of the middle flange.
Figure 6:
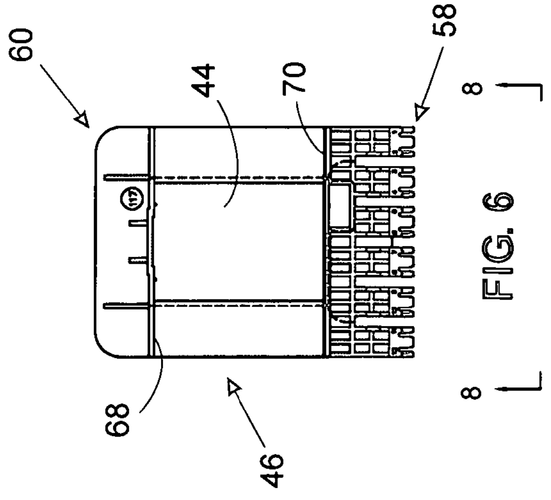
FIG. 6 is a top view if the bobbin illustrated in FIG. 5 illustrating the top flange formed with integrated sockets on one end of the flange for receiving primary terminals.
Figure 8:
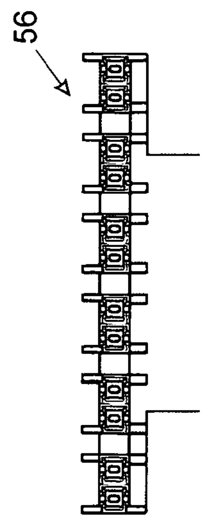
FIG. 8 is a section view along line 8-8 of FIG. 6 further illustrating the primary sockets.

A partial view of the middle flange 48 is illustrated in FIG. 9. As shown, one or both ends of the middle flange 48 may be formed with one or more teeth 76. As mentioned above, bobbins, such as the bobbin 26 allow the primary and secondary windings 22 and 24, respectively, to be wound by a coil winding machine. The teeth 76 are used to orientate and register the bobbin with respect to the coil winding machine.

Figure 12:
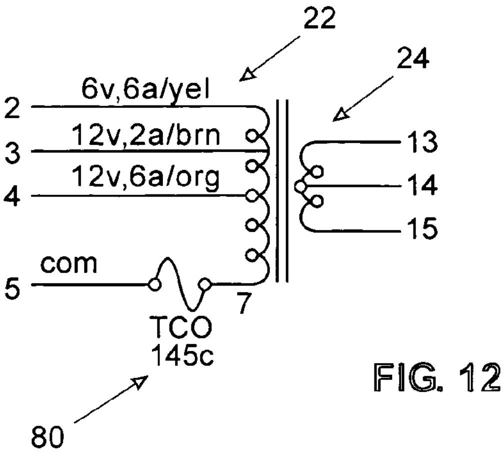
FIG. 12 is an exemplary schematic diagram of a transformer in accordance with the present invention illustrating four primary taps and three secondary taps.
Figure 13:
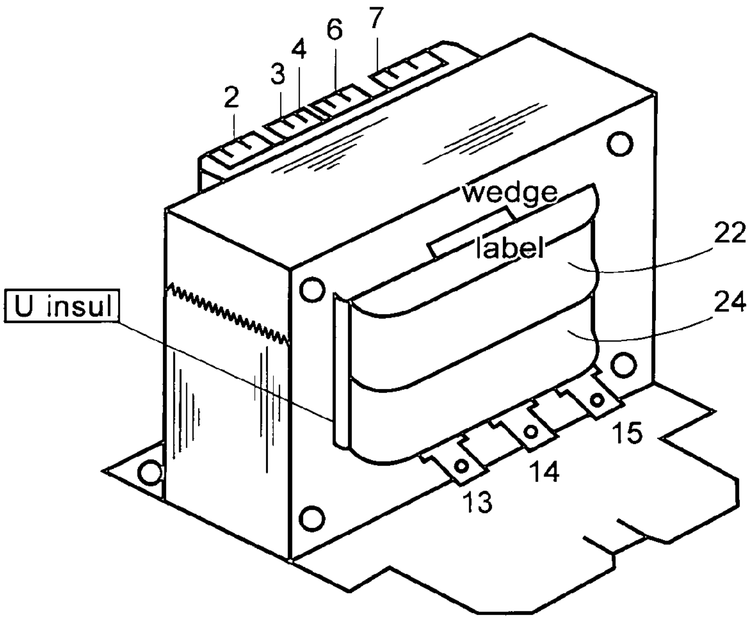
FIG. 13 is an isometric view of a transformer in accordance with the present invention illustrating an exemplary transformer in accordance with the present invention, configured as illustrated in FIG. 12.
Figure 14:
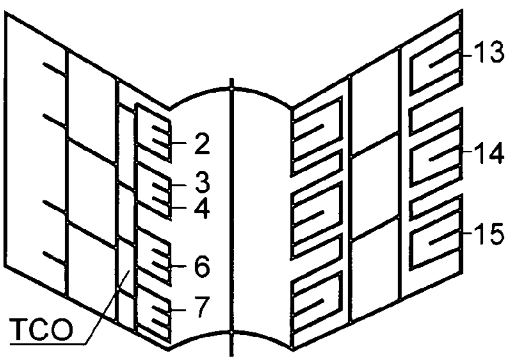
FIG. 14 is a manufacturing drawing which illustrates the locations of the various taps illustrated in FIG. 12 relative to the installed primary and secondary terminals.
Figure 15A:
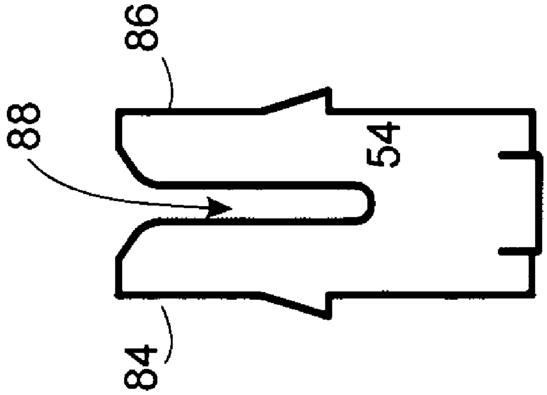
FIGS. 15A-15D illustrates an exemplary compression type terminal for use with the present invention.
Figure 15B:
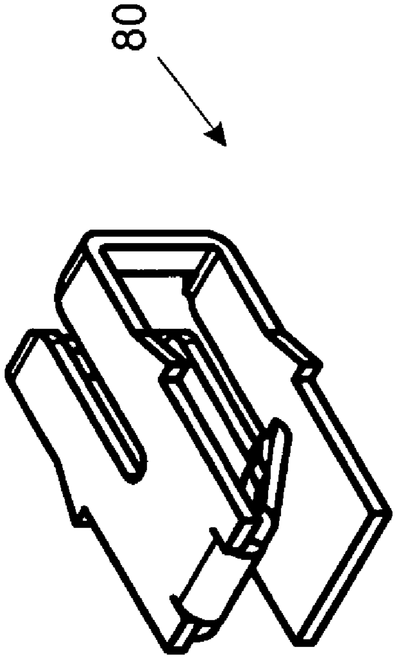
Figure 15C:
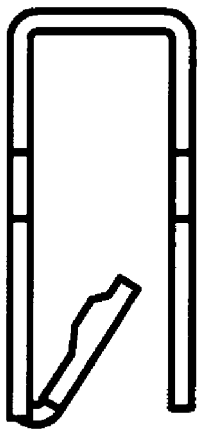
Figure 15D:
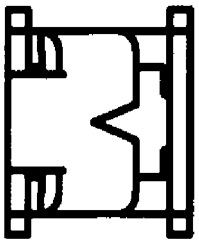
Figure 16A:
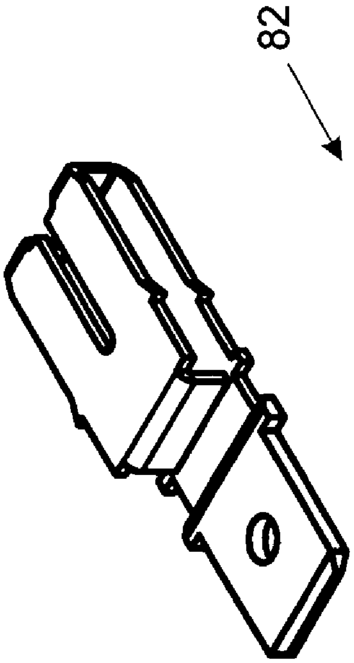
FIGS. 16A-16D illustrate an exemplary lug type terminal in accordance with the present invention.
Figure 16B:
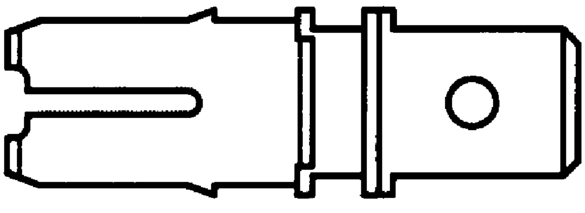
Figure 16C:
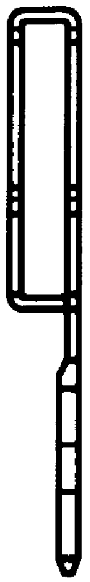
Figure 16D:
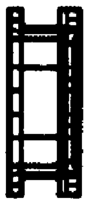

FIGS. 12-14 illustrate an exemplary configuration of a transformer in accordance with the present invention. FIG. 12 illustrates an exemplary schematic illustrating two primary terminals, identified with the terminal numbers 2 and 7, an auxiliary terminal 6 and two primary tap terminals, identified with the terminal numbers 3 and 4. As shown in FIG. 12, the terminals 6 and 7 are used to connect the primary winding 22 to a conventional thermal cut-out device (TCO) or a reset thermal protector (TP) or both. In such an application, a stacked terminal arrangement, for example, as shown in FIG. 11 may be used.

As illustrated in FIG. 12, the taps 3 and 4 are used for different turns ratio implementations. In this case, the auxiliary terminal 6 is designated as common. Connecting an external primary circuit to the common terminal 6 and either the primary terminal 2 or one of the primary taps, terminals 3 and 4, provides for different turns ratios of the transformer. As shown, the transformer is provided with the secondary terminals 13 and 15 and a single secondary tap terminal 14. The secondary tap is normally used to provide a voltage that is a fraction of the voltage across the secondary terminals 13 and 15.

A physical implementation of transformer illustrated schematically in FIG. 12 is illustrated In FIG. 13. As shown, the primary terminals 38 are identified with the terminal numbers 2, 3, 4, 6 and 7 and the secondary terminals 40 are identified with the terminal numbers 13, 14 and 15. FIG. 14 is used to map the primary and secondary windings as well as the taps to the various terminals on the transformer.

In accordance with an important aspect of the invention, insulation displacement terminals are used for connection to the aluminum wire. Exemplary terminals are illustrated in FIGS. 15A-15D and FIGS. 16A-16D and may be formed from tin plated brass materials. The terminals identified in FIGS. 15A-15D, generally identified with the reference numeral 80, are compression type terminals. The terminals identified in FIGS. 16A-16D, generally identified with the reference numeral 82, are lug type terminals. As discussed above, the sockets 56 (FIG. 8) and 62 (FIG. 10), integrally formed in the bobbin 26, are configured to receive the terminals 80 (FIGS. 15A-15D) and 82 (FIGS. 16A-16D). The terminals 80 and 82 may be, for example, Amp Magmate Series 300 and Series 500 terminals. Other insulation displacement type terminals are also contemplated.

In accordance with an important aspect of the invention, the use of insulation displacement type terminals provides a secure and relatively long lasting connection between the aluminum wire and its corresponding terminal which compensates for any oxidation of the aluminum conductor which might otherwise compromise the connection. In particular, the insulation displacement type terminals, such as the terminals 80 and 82 are formed with two cantilever beams 84 and 86 with a slot 88 there between, as shown for example in FIG. 15B. The terminals 80 and 82 are selected so that the width of the slot 88 is relatively smaller than the cross-sectional dimension of the aluminum conductor. Normally a terminal inserter is used to automatically cut the terminals from a strip. After the terminals are cut from the strip, the terminal inserter places the terminal over the aluminum magnet wire and inserts the terminal into a socket 56 (FIG. 8) or 62 (FIG. 10). Since the cross-sectional dimension of the aluminum magnet wire is relatively larger than the width of the slot 88 (FIG. 15B) of the terminal 80 (FIG. 15A-D) or 82 (FIG. 16A-D), the action of inserting the terminal 80, 82 into a socket 56, 62 on the bobbin 26, strips any coating or other contaminant from the aluminum conductor as well as from the interior of the slot 88, thus providing a clean metal to metal connection between the aluminum conductor and the terminal. Another benefit of the invention is that since the cross-sectional dimension of the aluminum magnet wire is relatively larger than the width of the slot 88 (FIG. 15B) of the terminal 80 (FIG. 15A-D) or 82 (FIG. 16A-D), there will be a constant residual spring force applied by the cantilever beams 84 and 86 on the aluminum conductor to assure a long term stable connection. Thus, even though transformers with aluminum windings are normally not used in the industry because of the oxidation of aluminum conductors, which can compromise any connections between the aluminum conductors and other devices, the present invention overcomes this problem by providing an aluminum wound transformer with long term stable connections to the primary and secondary terminals.

Obviously, many modifications and variations of the present invention are possible in light of the above teachings. Thus, it is to be understood that, within the scope of the appended claims, the invention may be practiced otherwise than as specifically described above.

I claim:

1. An aluminum wound transformer comprising:

a primary winding formed from magnet wire;

a secondary winding formed from magnet wire; wherein at least one of said primary winding and said secondary winding are formed from an aluminum conductor;

a ferromagnetic core for said primary and secondary windings;

a bobbin about which said primary and secondary windings are wound, said bobbin formed with integral primary and secondary sockets;

at least two primary terminals connected to said magnet wire forming said primary winding, configured to be received in said primary sockets; and;

at least two secondary terminals connected to said magnet wire forming said secondary winding, configured to be received in said secondary sockets, wherein at least one of said primary and secondary terminals being insulation displacement type terminals for connection to said magnet wire, said insulation displacement type terminals configured to exert a spring force on said magnet wire after said magnet wire has been connected thereto.

2. The aluminum wound transformer as recited in claim 1, wherein both of said primary winding and said secondary windings are formed from an aluminum conductor and said primary and secondary terminals are insulation displacement type terminals.

3. The aluminum wound transformer as recited in claim 1, wherein said transformer is formed with at least one primary tap terminated to a primary tap terminal.

4. The aluminum wound transformer as recited in claim 1, wherein said transformer is formed with at least one secondary tap terminated to a secondary tap terminal.

5. The aluminum wound transformer as recited in claim 1, wherein said transformer includes a thermal cutout or a reset type thermal protector or both.

6. The aluminum wound transformer as recited in claim 5, wherein said transformer further includes an auxiliary terminal and said thermal cut-out is connected between one of said primary terminals and said auxiliary terminal.

7. The aluminum wound transformer as recited in claim 1, wherein said bobbin is formed with at least three spaced apart flanges defining a lower flange, a middle flange and an upper flange.

8. The aluminum wound transformer as recited in claim 7, wherein said lower flange is formed with at least one row of sockets for receiving terminals.

9. The aluminum wound transformer as recited in claim 7, wherein said lower flange is configured with two stacked rows of sockets for receiving terminals.

10. The aluminum wound transformer as recited in claim 7, wherein said lower flange includes two opposing ends and sockets are formed on one end.

11. The aluminum wound transformer as recited in claim 7, wherein said lower flange includes two opposing ends and sockets are formed on both ends.

12. The aluminum wound transformer as recited in claim 7, wherein said upper flange is formed with at least one row of sockets for receiving terminals.

13. The aluminum wound transformer as recited in claim 7, wherein said upper flange includes two opposing ends and sockets are formed on one end.

* * * * *